Patented July 11, 1939

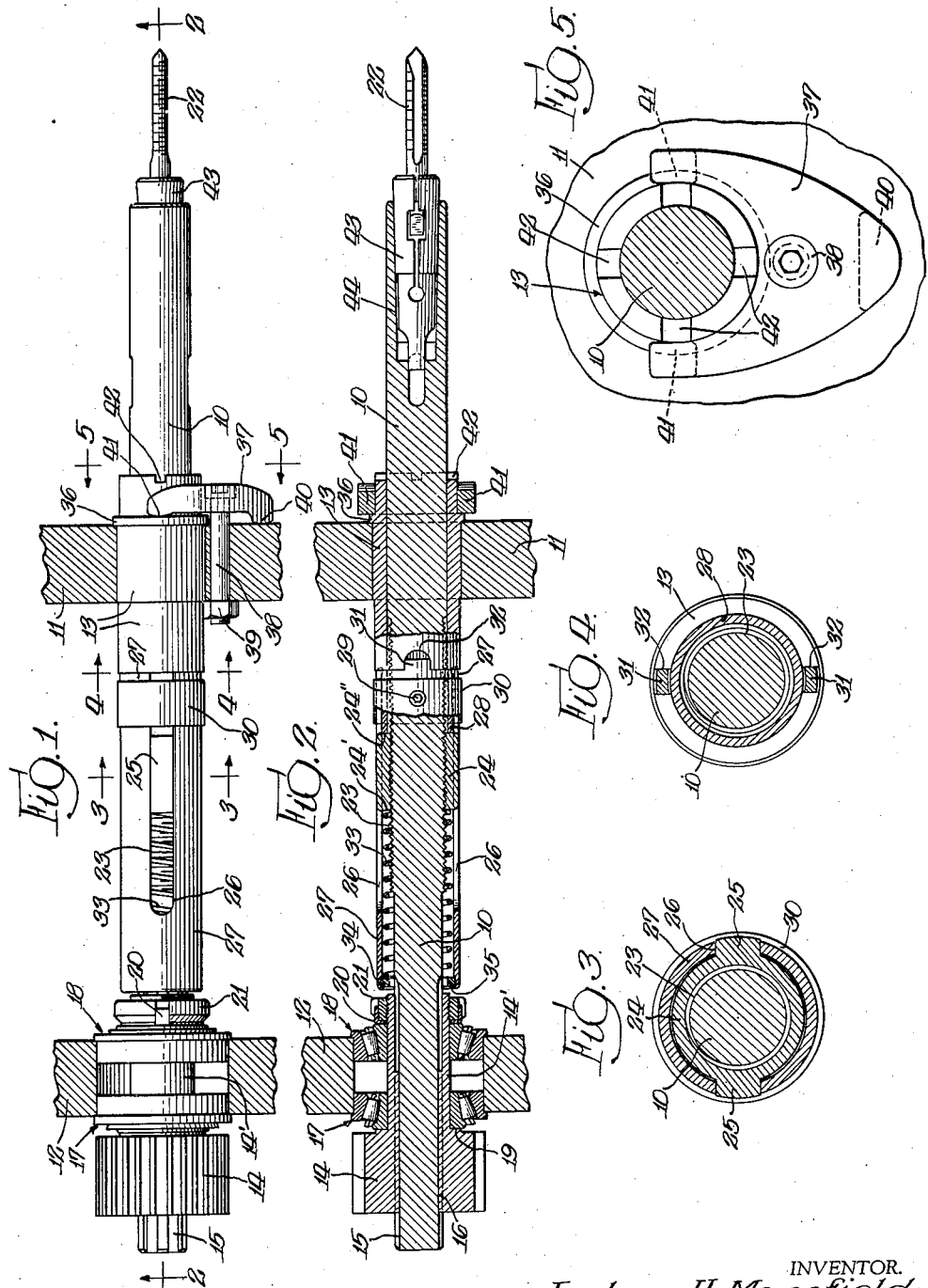

2,165,396

UNITED STATES PATENT OFFICE 2,165,396

TAPPING MACHINE

Judson H. Mansfield, Rockford, Ill., assignor to Greenlee Bros. & Co., Rockford, Ill., a corporation of Illinois Application March 15, 1938, Serial No. 196,025

15 Claims. (Cl. 10—135)

More particularly the invention relates to individual lead screw tapping spindles or spindle assemblies, it being the general object of the invention to provide a new and improved tapping spindle of this type.

Another object is to provide a new and improved individual lead screw spindle assembly which has means yielding when an obstruction is encountered so as to prevent damage to the tap and work, and which automatically resets itself when reversed and withdrawn from the work.

Another object is to provide such a spindle assembly which is readily removable from the head or other machine part in which it is supported.

Another object is to provide such a spindle assembly which can be adjusted from the outside of its supporting head.

Another object is to provide an individual lead screw tapping spindle assembly of simple construction and which is efficient and reliable in operation and readily installed and adjusted.

Further objects will become readily apparent from the following detailed description, taken in connection with the accompanying drawing, in which:

Fig. 1 is a vertical section through a spindle supporting head showing a preferred form of the invention in elevation.

Fig. 2 is a section through the head and spindle along the line 2—2 of Fig. 1, a portion being shown in elevation for the sake of clearness.

Figs. 3, 4 and 5 are transverse sections along the lines 3—3, 4—4 and 5—5 of Fig. 1, respectively.

While the invention is susceptible of various modifications and alternative constructions, it is here shown and will hereinafter be described in a preferred embodiment, but it is not intended that the invention is to be limited thereby to the specific construction disclosed, but it is intended to cover all modifications and alternative constructions falling within the spirit and scope of the invention as defined by the appended claims.

In the form chosen for purposes of disclosure, a tapping spindle 10 is rotatably mounted in a head or support having a forward wall 11 and an inner wall 12, the forward end of the spindle being supported in a sleeve bearing 13. The rear end of the spindle extends through a splined bore of a drive pinion 14 and has splines 15 in slidable and driving engagement with splines 16 on the pinion. The pinion has a tubular extension 14' which is rotatably supported on the wall 12 of the machine head by means of a pair of roller bearings 17 and 18, the pinion being secured against movement longitudinally of the bearing by means of a shoulder 19 on the pinion engaging the inner race of bearing 17 and a lock washer 20 which is clamped against the inner race of bearing 18 by means of a nut 21 threaded onto the end of the tubular extension 14'. The pinion 14 serves as a drive means for the spindle and may, itself, be driven by a suitable motor and gearing (not shown) in a manner well known in the art.

Upon driving the pinion 14, the pinion will, through the splines 15 and 16, drive the spindle 10, and since the splined end of the spindle is slidable longitudinally in the pinion and bearing 13, it is free to move toward the right to engage a tap 22 with a work piece (not shown) and to feed the tap relatively to the work.

In order to relieve the cutting teeth on the tap from the function of feeding the spindle relatively to the work, the spindle is provided with an individual lead screw 23 which is formed on an intermediate portion thereof and engages a nut 24. In the form of the invention disclosed herein, the nut 24 is normally held against rotation but is yieldable in a direction away from the work piece in the event the tap encounters an obstruction. To this end, the nut 24 is provided with a pair of diametrically positioned outwardly extending lugs 25 which engage in longitudinal slots 26 formed in a tubular member 27. This member is secured to a reduced portion 28 of the sleeve bearing 13 by means of a pair of oppositely disposed screw devices 29 which extend through a band 30 on the member 27 and into threaded engagement with the bearing sleeve portion 28. The band 30 is preferably provided for additional strength when the slots 26 extend to the adjacent end of the member 27 and may be secured thereto by solder or in any other suitable manner. As illustrated herein, the member 27 is also provided with a pair of diametrically opposite projections 31 which engage in recesses 32 in the main portion of the sleeve bearing 13.

The nut 24 is yieldably mounted by means of a coiled spring 33, interposed between the rear face 24' of the nut and a ring 34 secured in the rear end of the tubular member 27 by turning the end inwardly at 35. This spring normally maintains the forward face 24'' of the nut in engagement with the rear end of the bearing sleeve portion 28 and is sufficiently strong to exert the pressure necessary to start the tap when it is fed into the hole usually provided in the work piece.

If, however, the tap meets an obstruction, such as a work piece in which no hole has been drilled, the nut 24 feds backward against the action of the spring 33. When the spindle rotation is reversed, the nut moves forward until it abuts the bearing sleeve before the tap and spindle are returned toward the left (Figs. 1 and 2) so that the individual lead screw and its nut are automatically reset.

The invention also provides a construction whereby the spindle may be adjusted from externally of the head in which it is mounted and, if desired, may readily be removed. In the present form, this is accomplished by securing the bearing sleeve 13 detachably in the forward wall 11 of the machine head and providing means for rotating this sleeve in the head to rotate the lead screw nut 24. Furthermore, the outer dimension of the sleeve 13 is made larger than the band 30 and the tubular member 27, so that the sleeve 13 and the entire spindle assembly may be drawn out toward the right, disengaging the rear or splined end of the spindle from the pinion 14.

The sleeve 13 is herein provided with a collar portion 36 which abuts against the adjacent face of the front wall 11 of the machine head and is adapted to be clamped in this position by means of a bifurcated clamp member 37 and a bolt 38 having a nut 39. The lower end of the clamp member has a projecting portion 40 forming a fulcrum, and the legs of the member have portions 41 engaging the outer face of the collar 36. The outer end of the bearing sleeve is provided with radially extending tool receiving slots 42 to facilitate rotating the sleeve when the clamp is loose, to adjust the lead screw nut. As shown herein, the bolt 38 is a socket-head type. The nut 39 is preferably secured to the head so as to permit removal of the bolt without dropping the nut.

The tap 22 is herein mounted in the usual holder 43 and secured in a tapered bore 44 in the spindle 10.

The operation of the invention is believed readily apparent. With the clamp 37 tightened and the pinion 14 driven (for example, in a clockwise direction looking at Figs. 3 and 4), the spindle will feed toward the right (Figs. 1 and 2) due to the action of the lead screw. The longitudinal movement of the spindle will continue under the control of the lead screw until the tap enters the usual drilled hole in the work piece and commences to cut. The lead screw is provided with the same number of threads per inch as the tap, so that the lead screw will cooperate with the tap in determining the feed of the tap into the work and the nut 24 will remain in engagement with the end of the bearing sleeve.

Generally, the work pieces placed in machines of the type under consideration are first provided with drilled holes properly located, so that the tap performs no drilling function. If, due to inadvertence or breakage of a drill in a drilling machine, a particular work piece does not have the necessary drilled hole, the tap encounters an obstruction, the nut 24 yields toward the left (Figs. 1 and 2) until the forward rotation of the spindle and tap ceases. Upon reversal of the spindle and tap, however, the nut moves back to its normal position and automatically resets the device for the next operation. Since it is customary to rotate the pinion 14 in a reverse direction exactly the same number of revolutions as it is rotated in a forward direction, the tap will be advanced and retracted exactly the same in all successive operations. When abnormal obstructions are encountered, the nut yields toward the left and prevents damage to the tap and work and still resets the device automatically upon reversal of the spindle.

The invention provides a simple and readily adjustable spindle assembly or structure. With the tubular member 27 secured to the bearing sleeve 13, the two parts form a unitary tubular carrier or supporting structure by which the spindle is rotatably, adjustably and removably mounted on the machine head. By loosening the clamp 37, the spindle may be adjusted and by removing the clamp the entire spindle assembly including the spindle and its supporting structure may be drawn out of the head toward the right (Figs. 1 and 2). Thus, when it is desired to change to a tap of a different thread, the entire spindle assembly may readily be removed and a new spindle assembly having a lead screw of the desired thread may be inserted.

When it is borne in mind that spindles of this kind are frequently used in multi-spindle machines having a large number of taps, the need for a readily removable spindle assembly, and also one which prevents breakage of the tap, will be readily apparent.

I claim as my invention:

1. In a tapping machine, in combination with a support for a tap spindle, a bearing sleeve mounted in a bore in said support, a clamp device for securing said sleeve in angularly adjusted position to said support, a tap supporting spindle rotatably mounted in said sleeve and having one end adapted for connection to a drive means, a lead screw on said spindle, a nut for said lead screw, means for securing said nut against rotation relative to the lead screw comprising a tubular member secured at one end to said bearing sleeve and having a longitudinal slot and means on said nut positioned in and movable longitudinally in said slot, means for normally holding said nut against longitudinal movement comprising a coil spring surrounding a portion of the spindle and having one end engaging the rear face of the nut, and means on said tubular member engaging the other end of said spring.

2. In a tapping machine, in combination with a support for a tap spindle, a tubular structure detachably mounted in a bore in said support, a clamp device for securing said structure in angularly adjusted position to said support, a tap supporting spindle rotatably mounted in said structure and having one end adapted for connection to a drive means, a lead screw on said spindle, a nut for said lead screw, means for securing said nut against rotation relative to the lead screw comprising a longitudinal slot in said tubular structure and means on said nut movable longitudinally in said slot, means for normally holding said nut against longitudinal movement comprising a coil spring surrounding a portion of the spindle and having one end engaging the rear face of the nut, and means on said tubular structure engaging the other end of said spring.

3. In a tapping machine, in combination with a support for a tap spindle, a bearing sleeve mounted in a bore in said support, a clamp device for securing said sleeve in angularly adjusted position to said support, a tap supporting spindle rotatably mounted in said sleeve and having one end adapted for connection to a drive means, a lead screw on said spindle, a nut for said lead screw, means for securing said nut against rotation relative to the lead screw comprising a tubular member secured at one end to said bearing sleeve and having a longitudinal slot, means on said nut positioned in and movable longitudinally in said slot, and means for normally holding said nut against longitudinal movement relatively to said tubular member.

4. In a tapping machine, in combination with a support having outer and inner walls, a drive pinion rotatably mounted on the inner wall, a bearing sleeve detachably mounted in axial alignment on the outer wall, a spindle rotatably mounted in said bearing sleeve and having a splined portion extending into said pinion to be supported and driven thereby, a lead screw on said spindle, a nut for said lead screw, means forming an abutment for the forward end of the nut to limit its movement in that direction, a spring device for maintaining said nut in engagement with said abutment and of sufficient strength to cause a tap on the spindle to start cutting a work piece, and means carried by and removable with said bearing sleeve for maintaining said spring in compression.

5. In a tapping machine, in combination with a support having outer and inner walls, a drive pinion rotatably mounted on the inner wall, a bearing sleeve mounted in axial alignment on the outer wall, a spindle rotatably mounted in said bearing sleeve and having a portion extending into said pinion to be supported and driven thereby, a lead screw on said spindle, a nut for said lead screw, means limiting its movement longitudinally in one direction, a spring device for normally maintaining said nut at the limit of its movement in said direction, and means carried by said bearing sleeve for holding said nut against rotation and for maintaining said spring in compression.

6. In a tapping machine, in combination with a support having outer and inner walls, a drive pinion rotatably mounted on the inner wall, a bearing sleeve detachably mounted in axial alignment on the outer wall, a spindle rotatably mounted in said bearing sleeve and having a splined portion extending into said pinion to be supported and driven thereby, a lead screw on said spindle, a nut for said lead screw, and means carried by and removable with said bearing sleeve for supporting said nut.

7. In a tapping machine, in combination with a support, a tubular member having one end mounted on said support, a tap supporting spindle rotatably mounted within said tubular member, a lead screw on said spindle, a nut for said lead screw movable longitudinally in said member, means on said nut and member for preventing rotary movement of the nut relatively to the member, while permitting relative longitudinal movement therebetween, yieldable means carried within said member adapted normally to resist movement of the nut relatively to the member in one direction, and a detachable clamping member for clamping said member to said support releasable to permit angular adjustment of said member on said support.

8. A tapping machine spindle having, in combination, a tubular member adapted at one end to be mounted on a support, a tap supporting spindle rotatably mounted within said tubular member, a lead screw on said spindle, a nut for said lead screw movable longitudinally in said member, means on said nut and member for preventing rotary movement of the nut relatively to the member, while permitting relative longitudinal movement therebetween, and yieldable means carried within said member adapted normally to prevent movement of the nut relatively to the member in one direction.

9. In a tapping machine, in combination with a support, an elongated member having one end mounted on said support, a tap supporting spindle rotatably mounted on said member, a lead screw on said spindle, a nut for said lead screw movable longitudinally on said member, means on said nut and member for preventing rotary movement of the nut relatively to the member, while permitting relative longitudinal movement therebetween, and means adapted normally to resist movement of the nut relatively to the member in one direction.

10. In a tapping machine, in combination with a support, a tubular member having one end mounted on said support, a tap supporting spindle rotatably mounted within said tubular member, a lead screw on said spindle, a nut for said lead screw movable longitudinally in said member, means on said nut and member for preventing rotary movement of the nut relatively to the member, and a clamping member for clamping said tubular member to said support releasable to permit the tubular member and the spindle therein to be removed from the support.

11. In a tapping machine, in combination with a support, a tubular member having one end mounted on said support, a tap supporting spindle rotatably mounted within said tubular member, a lead screw on said spindle, a nut for said lead screw movable longitudinally in said member, means on said nut and member for preventing rotary movement of the nut relatively to the member, while permitting relative longitudinal movement therebetween in one direction during a tapping operation, and means for moving the nut in the opposite direction upon reversal of the spindle.

12. In a tapping machine in combination with a supporting structure, a tap supporting spindle rotatably mounted on said supporting structure, a lead screw on said spindle, a nut on said lead screw, means for preventing relative rotary movement between said nut and said supporting structure while permitting relative longitudinal movement therebetween in one direction, and yieldable means normally preventing such longitudinal movement yieldable in the event the tap encounters an obstruction and operating automatically to return the nut to its normal position upon reversal of the tap spindle.

13. In a tapping machine in combination with a supporting structure, a tap supporting spindle rotatably mounted on said supporting structure, a lead screw on said spindle, a nut on said lead screw, means for preventing relative rotary movement between said nut and said supporting structure while permitting relative longitudinal movement therebetween in one direction, and means normally preventing such longitudinal movement yieldable in the event the tap encounters an obstruction during forward rotation thereof and operating automatically to reset the nut and screw device to their normal position upon reversal of the tap spindle.

14. In a tapping machine in combination with a supporting structure, a tap supporting spindle rotatably mounted on said supporting structure, a lead screw on said spindle, a nut on said lead screw, and means normally maintaining said nut stationary on said supporting structure including yieldable means operable to permit movement of the nut on the supporting structure in the event the tap encounters an obstruction and operating automatically to return the nut to its normal position upon reversal of the tap spindle.

15. A tapping machine spindle assembly having, in combination, a member adapted to be mounted on a support, a tap supporting spindle rotatably mounted on said member, a lead screw on said spindle, a nut on said lead screw movable longitudinally of said member, means on said nut and member for preventing rotary movement of the nut relatively to the member, while permitting relative longitudinal movement therebetween, and yieldable means adapted normally to prevent movement of the nut relatively to the member in one direction but yieldable in the event the tap encounters an obstruction, said yieldable means operating automatically to return the nut to its normal position upon reversal of the tap spindle.

JUDSON H. MANSFIELD.